(12) United States Patent
Wallander

(10) Patent No.: US 9,678,602 B2
(45) Date of Patent: Jun. 13, 2017

(54) TOUCH-SENSITIVE APPARATUS WITH IMPROVED SPATIAL RESOLUTION

(71) Applicant: FlatFrog Laboratories AB, Lund (SE)

(72) Inventor: Mats Petter Wallander, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 241 days.

(21) Appl. No.: 14/402,562

(22) PCT Filed: May 22, 2013

(86) PCT No.: PCT/SE2013/050583
§ 371 (c)(1),
(2) Date: Nov. 20, 2014

(87) PCT Pub. No.: WO2013/176613
PCT Pub. Date: Nov. 28, 2013

(65) Prior Publication Data
US 2015/0083891 A1   Mar. 26, 2015

Related U.S. Application Data

(60) Provisional application No. 61/650,624, filed on May 23, 2012.

(30) Foreign Application Priority Data

May 23, 2012   (SE) ...................................... 1250519

(51) Int. Cl.
   *G06F 3/042*   (2006.01)
(52) U.S. Cl.
   CPC .. *G06F 3/0421* (2013.01); *G06F 2203/04109* (2013.01)

(58) Field of Classification Search
   CPC ...... G06F 3/042; G06F 3/0421; G06F 3/0428; G06F 3/0304
   (Continued)

(56) References Cited

U.S. PATENT DOCUMENTS 3,673,327 A   6/1972   Johnson et al.
4,254,333 A   3/1981   Bergstrom
(Continued)

FOREIGN PATENT DOCUMENTS

WO   WO-2009/077962 A2   6/2009
WO   WO-2010/015408 A1   2/2010
(Continued)

OTHER PUBLICATIONS

Kak, Avinash C. and Malcolm Slaney. *Principles of Computerized Tomographic Imaging*. New York: IEEE Press, 1988.
(Continued)

*Primary Examiner* — Kevin Pyo
(74) *Attorney, Agent, or Firm* — Harness, Dickey & Pierce PLC

(57) ABSTRACT

A touch-sensitive apparatus is configured to define a touch surface on a panel by propagating diverging energy beams (e.g. of radiation) across the touch surface inside the panel. Two rows (20A, 20B) of components (2, 3) of a first type that emits energy as a diverging beam and a second type that detects energy are functionally connected to the panel at opposite ends of the touch surface. The rows (20A, 20B) are defined by consecutive component blocks (B) that each contain only components (2, 3) of one type and are defined by type and number of included components. Each row (20A, 20B) comprises a respective sequence (S) of two component blocks (B) of different types and is defined by systematically repeating the sequence (S) along the respective opposite end. To achieve an improved spatial resolution (Continued)

of the touch-sensitive apparatus for a given number of components, at least one of the sequences (S) is selected to consist of two component blocks (B) with different number of components, and the sequences (S) are selected such that at least one component block (B) differs between the sequences (S).

16 Claims, 6 Drawing Sheets

(58) Field of Classification Search
USPC .......... 250/221, 222.1, 206.1; 345/173, 175, 345/178
See application file for complete search history.

(56) References Cited

U.S. PATENT DOCUMENTS

| | | | |
|---|---|---|---|
| 6,429,857 B1 | 8/2002 | Masters et al. | |
| 6,690,363 B2 | 2/2004 | Newton | |
| 7,042,444 B2 | 5/2006 | Cok | |
| 7,432,893 B2 | 10/2008 | Ma et al. | |
| 7,855,716 B2 | 12/2010 | McCreary et al. | |
| 2006/0114237 A1 | 6/2006 | Crockett et al. | |
| 2010/0066016 A1 | 3/2010 | Van De Wijdeven et al. | |
| 2010/0295821 A1* | 11/2010 | Chang | G06F 3/0421 345/175 |
| 2011/0115748 A1 | 5/2011 | Xu | |
| 2011/0157096 A1 | 6/2011 | Drumm | |
| 2011/0234537 A1 | 9/2011 | Kim et al. | |
| 2011/0261020 A1 | 10/2011 | Song et al. | |

FOREIGN PATENT DOCUMENTS

| | | |
|---|---|---|
| WO | WO-2010/046539 A1 | 4/2010 |
| WO | WO-2010/064983 A2 | 6/2010 |
| WO | WO-2010/081702 A2 | 7/2010 |
| WO | WO-2010/112404 A1 | 10/2010 |
| WO | WO-2011/049511 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/062471 A2 | 5/2013 |
| WO | WO-2013/089622 A2 | 6/2013 |

OTHER PUBLICATIONS

Natterer, Frank. *The Mathematics of Computerized Tomography*. New York: Society for Industrial and Applied Mathematics, 1986.

* cited by examiner

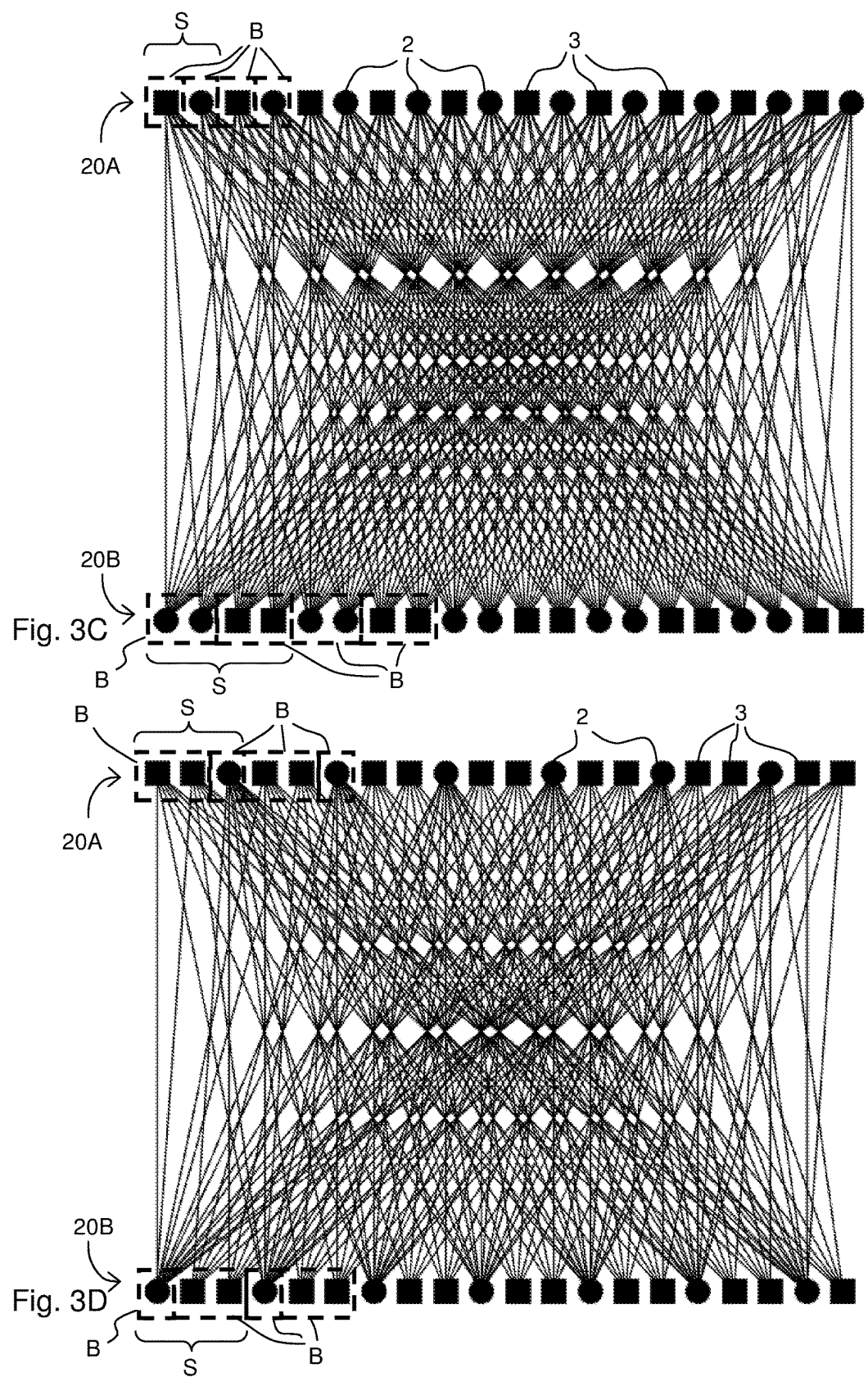

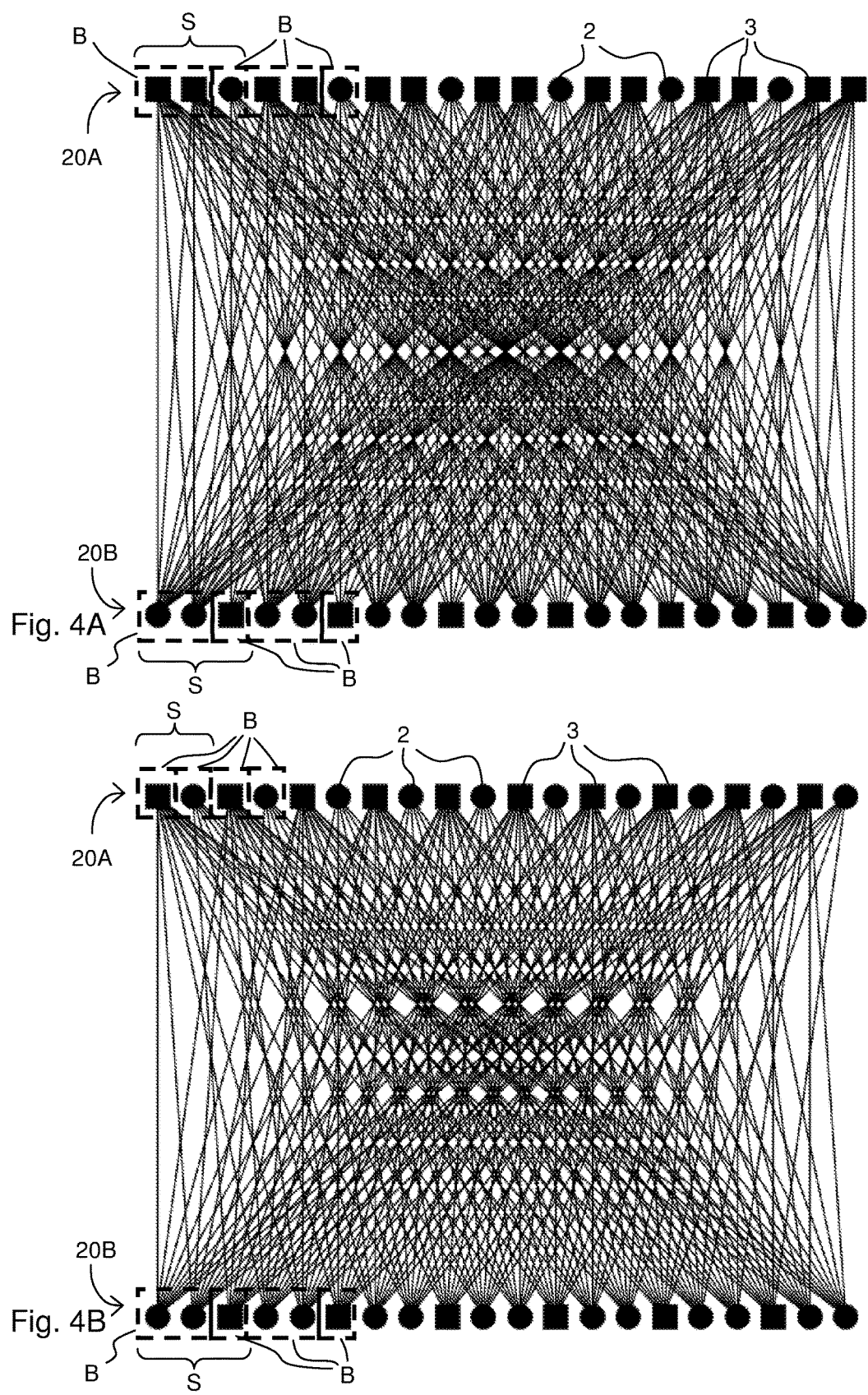

TOUCH-SENSITIVE APPARATUS WITH
IMPROVED SPATIAL RESOLUTION

CROSS-REFERENCE TO RELATED
APPLICATIONS

This application is a national phase under 35 U.S.C. §371 of PCT International Application No. PCT/SE2013/050583 which has an International filing date of May 22, 2013, which claims priority to Sweden patent application number SE 1250519-4 filed May 23, 2012 and U.S. provisional patent application No. 61/650,624 filed May 23, 2012.

TECHNICAL FIELD

The present invention relates to a touch-sensitive apparatus that operates by propagating energy beams across a touch surface inside a panel.

BACKGROUND ART

This type of touch-sensitive apparatus is known in the art. It may be implemented to operate by transmitting light inside a solid light transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

In one configuration, e.g. disclosed in U.S. Pat. No. 3,673,327, U.S. Pat. No. 4,254,333 and US2006/0114237, the emitters and detectors are arranged in rows on opposite ends of the panel, and the light is propagated between opposite pairs of emitters and detectors so as to define a rectangular grid of propagation paths.

As an alternative, U.S. Pat. No. 7,432,893 proposes the use of a few large emitters arranged at the corners of the panel, or centrally on each end of the panel, to inject diverging light beams ("fan beams") into the panel for receipt by arrays of detectors along all ends of the panel. This configuration may enable an increased spatial resolution for a given number of emitters and detectors, by increasing the density of the grid of propagation paths. The spatial resolution indicates the smallest object that can be detected by the touch-sensitive apparatus at a given location on the touch surface.

In an alternative configuration, e.g. disclosed in WO2009/077962, US2011/0234537, US2011/0157096, rows of regularly spaced fan beam emitters and detectors, respectively, are arranged on opposite ends of the panel to define a dense grid of propagation paths across the touch surface.

WO2010/064983 discloses further alternative configurations. In one configuration, which is intended to improve the uniformity of the grid of propagation paths, fan beam emitters and detectors are alternated with equal spacing around the periphery of the touch surface. In another configuration, which is intended to reduce interference phenomena that may occur when different emitters concurrently inject light of the same wavelength into the panel, fan beam emitters and detectors are arranged with randomized spacing around the periphery of the touch surface.

In this type of touch-sensitive apparatus, there is a continued desire to improve the spatial resolution with respect to the uniformity of the spatial resolution across the touch surface or the minimum detectable object size at a given position on the touch surface.

SUMMARY

It is an objective of the invention to at least partly overcome one or more limitations of the prior art.

Another objective is to enable an improved spatial resolution for a given number of electro-optical components in a touch-sensitive apparatus that operates by propagating energy beams across a touch surface inside a panel.

One or more of these objectives, as well as further objectives that may appear from the description below, are at least partly achieved by means of a touch-sensitive apparatus according to the independent claims, embodiments thereof being defined by the dependent claims.

One aspect of the invention is a touch-sensitive apparatus which comprises: a panel defining a touch surface; and opposite rows of components which are connected for energy exchange with the panel at opposite ends of the touch surface. The components are of a first type that emits energy as a diverging beam and a second type that detects energy. Each of the opposite rows comprises an arrangement of consecutive component blocks, each component block containing only components of the first type or the second type and being defined by a type value, which indicates the type of the components in the component block, and a number value, which indicates the number of components in the component block. Each of the opposite rows comprises a respective sequence of two component blocks of different types and is defined by systematically repeating the respective sequence along the respective opposite end. Furthermore, the two component blocks in the sequence of one of the opposite rows have different number values, and at least one component blocks differs between the sequences of the opposite rows.

This aspect is based on the insight that the configurations of prior art solutions, which propagate diverging energy beams inside a panel and have alternating components of the first and second types in the opposite rows, will result in a convergence of the propagation paths towards the center line between the opposite rows. Thereby, the grid of propagation paths will exhibit increased gaps without propagation paths near the center line, which is equal to a locally reduced spatial resolution. To overcome this drawback, the two component blocks in the sequence of one (or both) of the opposite rows have different number values, and at least one component blocks differs between the sequences of the opposite rows. By applying this design rule, the convergence of the propagation paths may be avoided or reduced and the propagation paths may be more distributed on the touch surface. By proper choice and arrangement of component blocks, the first aspect thus provides an increased uniformity and/or a reduced spacing of propagation paths for a given number of components, compared to a conventional arrangement of components.

In one embodiment, the component blocks contains a maximum of two or three components.

In one embodiment, the two component blocks in the sequence of the other of the opposite rows have different number values.

In one embodiment, one of the opposite rows consists of a component block with one component of the first type and a component block with two components of the second type, and the other of the opposite rows consists of a component block with two components of the first type and a component block with one component of the second type.

In one embodiment, in at least one of the opposite rows, the ratio of the number of components of the first type to the number of components of the second type is in the range of between 0.2 and 5.

In one embodiment, each of the opposite rows comprises at least 20 components, and preferably at least 30 components.

In one embodiment, the mutual spacing of the components is equidistant in at least one of the opposite rows.

In one embodiment, the mutual spacing of the components is systematically or randomly varied within at least one of the opposite rows.

In one embodiment, the component of the second type is a detector which is configured to receive energy within a range of angles of incidence, preferably energy emitted by at least two components of the first type.

In one embodiment, the opposite rows define a grid of transmission paths that extend across the touch surface from the components of the first type to the components of the second type, wherein each component of the second type is operable to detect energy on a set of transmission paths that extend from at least two components of the first type. The touch-sensitive apparatus may further comprise a signal processor operable to acquire, from the components of the second type, an output signal indicative of the detected energy on each of the transmission paths in the grid of transmission paths and to process the detected energy for determination of a property of a touching object on the touch surface.

In one implementation, each component of the first type is an emitter which is configured to generate radiation and is optically coupled to the panel so as to propagate a diverging beam of radiation across the touch surface by internal reflections inside the panel, and each detector is configured to detect radiation and is optically coupled to the panel so as to detect transmitted radiation from at least two emitters.

In one embodiment, the opposite rows define a grid of transmission paths that extend between the components of the first type and the components of the second type, wherein the arrangements of consecutive component blocks in the opposite rows are configured so as to generate, for a given mutual spacing between the components, a decreased maximum spacing of transmission paths compared to an alternating arrangement of single components of the first and second types in both of the opposite rows.

In one embodiment, the opposite rows define transmission paths that extend between the components of the first type and the components of the second type, said transmission paths forming a plurality of intersection points on the touch surface, wherein the arrangements of consecutive component blocks in the opposite rows are configured so as to generate, for a given mutual spacing between the components, a decreased average number of transmission paths per intersection point compared to an alternating arrangement of single components of the first and second types in both of the opposite rows.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 3C-3D illustrate two alternative that arrangements yield grids of detection lines with similar properties.

FIGS. 4A-4C are top plan views of grids of detection lines in an apparatus which is designed in accordance with embodiments of the invention.

DETAILED DESCRIPTION OF EXAMPLE EMBODIMENTS

Figure 1A:
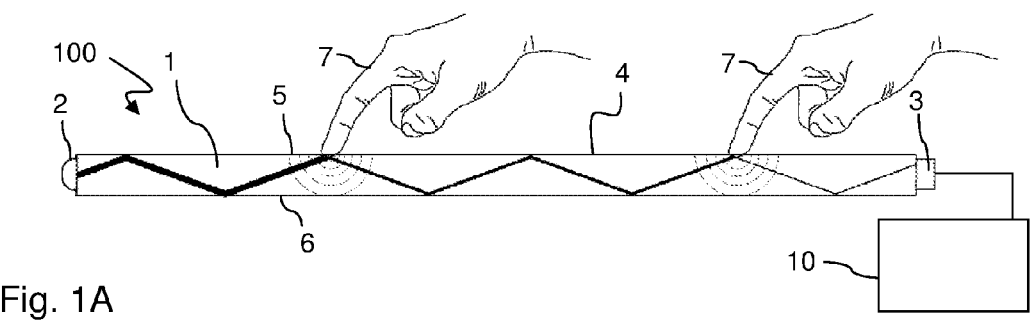
FIGS. 1A-1B are section and top plan views of an optical touch-sensitive apparatus.

In the following, examples of the present invention will be given in relation to a touch-sensitive apparatus designed to operate by light transmission. Throughout the description, the same reference numerals are used to identify corresponding elements.

Figure 1B:
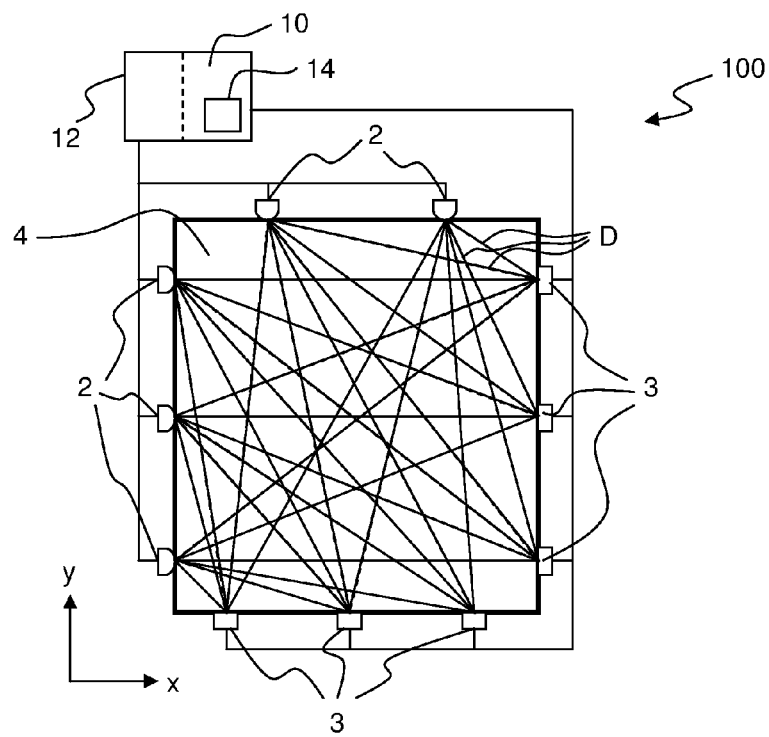

FIGS. 1A-1B illustrate an example embodiment of a touch-sensitive apparatus 100 that is based on the concept of FUR (Frustrated Total Internal Reflection). The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor (not shown).

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. Each light sheet is formed as a beam of light that expands (as a "fan beam") in the plane of the panel 1 while propagating in the panel 1 from a respective incoupling region/point on the panel 1. The detectors 3 are distributed along the perimeter of the touch surface 4 to receive the light from the emitters 2 at a number of spaced-apart outcoupling regions/points on the panel 1. It should be understood that the incoupling and outcoupling regions/points merely refer to the positions where the beams enter and leave, respectively, the panel 1. The light from each emitter 2 will propagate inside the panel 1 to a number of different detectors 3 on a plurality of light propagation paths D, and each detector 3 is arranged to receive light on a plurality of light propagation paths, i.e. from a plurality of emitters 2. Even if the light propagation paths D correspond to light that propagates by internal reflections inside the panel 1, the light propagation paths D may conceptually be represented as "detection lines" that extend across the touch surface 4 between pairs of emitters 2 and detectors 3, as shown in FIG. 1B. Thereby, the emitters 2 and detectors 3 collectively define a non-rectilinear grid of detection lines D ("detection grid") on the touch surface 4. The spacing of intersections in the detection grid defines the spatial resolution of the apparatus 100, i.e. the smallest object than can be detected on the touch surface 4.

Each detector 3 is operated to measure the amount of the received light on a plurality of light propagation paths D, and the detectors 3 collectively provide an output signal, which is received and sampled by a signal processor 10. The output signal contains a number of sub-signals, also denoted "projection signals", each representing the energy of light emitted by a certain light emitter 2 and received by a certain light detector 3. Depending on implementation, the signal processor 10 may need to process the output signal for separation of the individual projection signals. The projection signals represent the received energy, intensity or power of light received by the detectors 3 on the individual detection lines D. Whenever an object touches a detection line, the received energy on this detection line is decreased or "attenuated".

Figure 2:
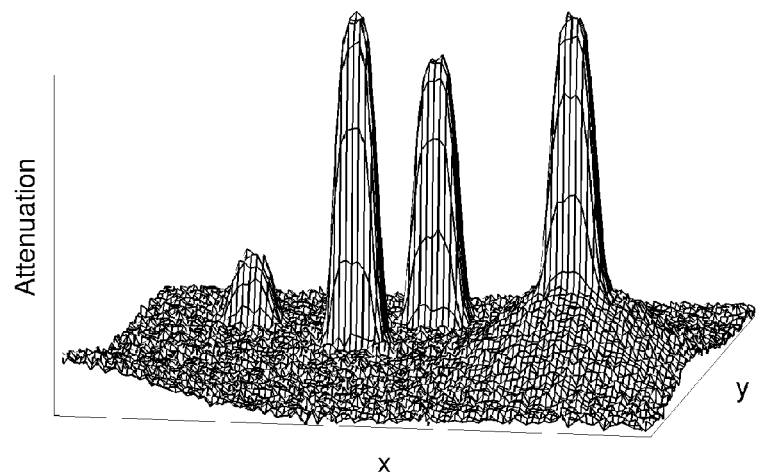
FIG. 2 is a 3D plot of an attenuation pattern generated based on energy signals from an optical touch-sensitive apparatus.

The signal processor 10 may be configured to process the projection signals so as to determine a property of the touching objects, such as a position (e.g. in the x,y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of a touch-sensitive apparatus. For example, instead of injecting and detecting light via the edge surface that connects the boundary surfaces 5, 6, light may be coupled into and/or out of the panel 1 via the top and/or bottom surfaces 5, 6, e.g. by the use of dedicated coupling elements attached to the panel 1. It is also conceivable that the light is coupled into and out of the panel 1 through different portions of the panel, e.g. via the boundary surface 5 and the boundary surface 6, respectively. Examples of alternative FTIR-based touch systems are e.g. disclosed in U.S. Pat. No. 7,432,893, WO2010/046539, WO2012/105893, and PCT/SE2012/051368 filed on Dec. 10, 2012, which are all incorporated herein by this reference.

Embodiments of the invention apply specific design rules for the ordering of emitters 2 and detectors 3 along the perimeter of the touch surface 4 to achieve desired properties of the detection grid on the touch surface 4, as will be further explained in relation to the top plan views in FIGS. 3-4. Each of the Figures illustrates a grid of detection lines that are defined between rows 20A, 20B of emitters 2 (filled circles) and detectors 3 (filled squares) on opposite ends or sides of a touch surface. For ease of presentation, the panel 1 and its touch surface 4 has been omitted in FIGS. 3-4. The design rules relate to selection and ordering of basic building blocks B (also denoted "component blocks" or "blocks"), which contain only one type of component, i.e. either one or more emitters 2 or one or more detectors 3. For ease of presentation, only a few building blocks B in are indicated in each Figure. In the following discussion, a block B is designated by a "type", which indicates if the block B includes emitter(s) or detector(s), and a "number", which indicates the number of included components. To facilitate the following discussion, the type is indicated by symbol X for detectors and symbol Y for emitters, and the number is indicated by a corresponding number of symbols. For example, a block with two detectors is designated by XX, and a block with one emitter is designated by Y.

Figures 3A, 3B:
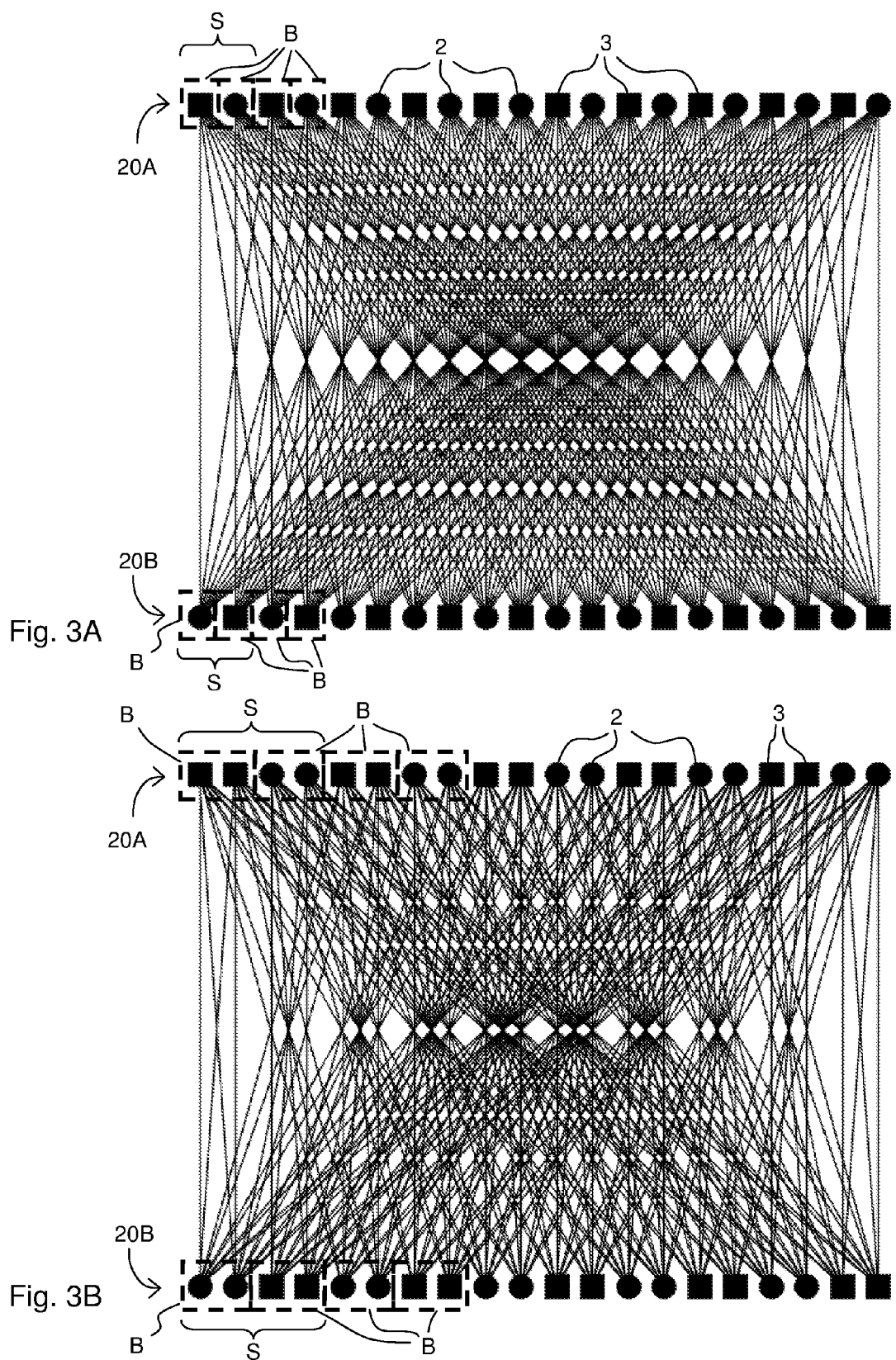
FIGS. 3A-3B are top plan views of grids of detection lines in a prior art apparatus for two types of arrangements with interleaved emitters and detectors.

FIG. 3A illustrates a conventional fan beam arrangement, denoted "interleaved arrangement" herein, in which emitters 2 and detectors 3 are arranged in alternating fashion with equal spacing in two rows 20A, 20B along opposite ends of the touch surface. As seen, both rows 20A, 20B are defined by an alternating arrangement of blocks B that contain only one emitter 2 or only one detector 3. The upper row 20A is defined by repeating a sequence S of one X block and one Y block along one end of the touch surface (S=X-Y), and the lower row 20B is defined by repeating a sequence S of one Y block and one X block along the opposite end of the touch surface (S=Y-X). The interleaved arrangement results in a symmetric detection grid, in which the detection lines converge towards intersection points on a center line between the rows 20A, 20B. As shown, this results in "gaps" in the detection grid. It can be shown that the horizontal width of the largest gaps is equal to the center-to-center spacing of components 2, 3 in the rows 20A, 20B. These gaps result in a highly non-uniform distribution of detection lines. Furthermore, the gaps define the spatial resolution of the touch apparatus, which is thereby given by the spacing of components 2, 3. As used herein, the "uniformity" of the detection grid may be defined in terms of the variations in the number of detection lines per unit area across the touch surface.

FIG. 3B illustrates another conventional fan beam arrangement, denoted "double interleaved arrangement" herein, which is defined by repeating a sequence S of one XX block and one YY block along the upper row 20A (S=XX-YY), and by repeating a sequence S of one YY block and one XX block in the lower row 20B (S=YY-XX). As seen, this arrangement also results in significant gaps in the detection grid, and the horizontal width of the largest gaps is again equal to the center-to-center spacing of components 2, 3 in the rows 20A, 20B.

FIGS. 3C and 3D illustrate further fan beam arrangements that have been found to result in similar gaps as the arrangements in FIGS. 3A-3B. In FIG. 3C, the upper row 20A is defined by repeating the sequence S=X-Y, and the lower row 20B is defined by repeating the sequence S=YY-XX. In FIG. 3D, the upper row 20A is defined by repeating the sequence S=XX-Y, and the lower row 20B is defined by repeating the sequence S=Y-XX. In FIGS. 3C-3D, the horizontal width of the largest gaps is again equal to the center-to-center spacing of components 2, 3 in the rows 20A, 20B.

As will be shown in the following, it is possible to improve the spatial resolution and/or uniformity of the detection grid by careful selection of the sequences S in the upper and lower rows 20A, 20B. Specifically, a general design principle has been identified for arrangements with rows 20A, 20B that are defined by repeating a respective sequence S that consists of one emitter block B and one detector block B. According to this general design principle, at least one of the sequences S consists of blocks B with different number values, and at least one of the sequences S includes one block B that is absent in the other sequence S.

FIG. 4A illustrates a first embodiment complying with the general design principle. In the first embodiment, the upper row 20A is defined by repeating the sequence S=XX-Y, and the lower row 20B is defined by repeating the sequence S=YY-X. Here, both sequences consists of blocks with different number values, and the blocks are unique for each sequence. By comparing FIG. 4A with FIGS. 3A-3D, it is realized that the first embodiment results in an improved uniformity of the detection grid and that the largest horizontal gap width at the center of the touch surface (i.e. disregarding the horizontal end portions where detection lines are sparse) is reduced. It can be shown that the maximum horizontal gap width is equal to 0.5 of the center-to-center spacing.

FIG. 4B illustrates a second embodiment complying with the general design principle. In the second embodiment, the upper row 20A is defined by repeating the sequence S=X-Y, and the lower row 20B is defined by repeating the sequence S=YY-X. Here, the sequence of row 20B consists of blocks with different number values, and each sequence has one block which is absent in the other sequence. It can be shown that the largest horizontal gap width at the center of the resulting detection grid is equal to 0.8 of the center-to-center spacing of the components. Thus, the second embodiment results in an improvement compared to FIGS. 3A-3D.

Figure 4C:
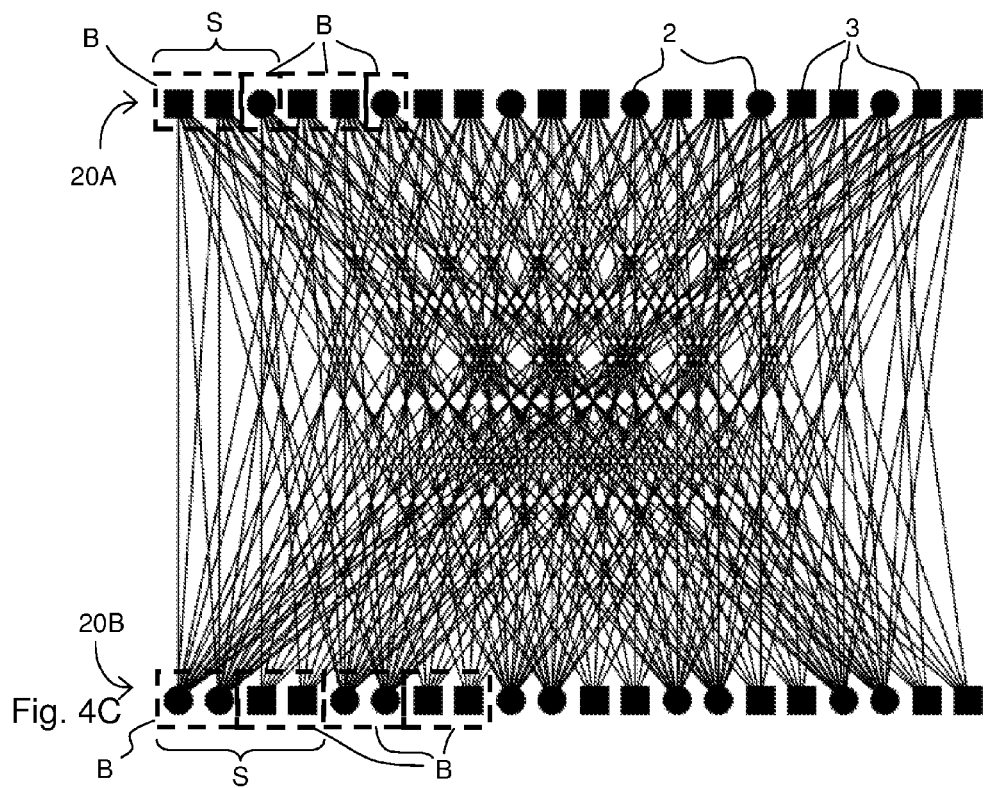

FIG. 4C illustrates a third embodiment complying with the general design principle. In the third embodiment, the upper row 20A is defined by repeating the sequence S=XX-Y, and the lower row 20B is defined by repeating the sequence S=YY-XX. Here, the sequence of row 20A consists of blocks with different number values, and each sequence has one block which is absent in the other sequence. It can be shown that the largest horizontal gap width at the center of the resulting detection grid is equal to 0.71 of the center-to-center spacing of the components. Thus, the third embodiment results in an improvement compared to FIGS. 3A-3D.

It is realized the above-described general design principle makes it possible to achieve an increased spatial resolution of the touch-sensitive apparatus without increasing the number of components per unit length in the opposite rows. Thus, embodiments of the invention make it possible to attain a higher spatial resolution for a given number of electro-optical components (emitters and detectors). A careful comparison of FIGS. 4A-4C with FIGS. 3A-3D also reveals that the general design principle results in a reduction, on average, in the number of detection lines that meet at each intersection point. This has been found to enable a suppression of artifacts that may otherwise arise when the attenuation pattern is reconstructed using image reconstruction algorithms, e.g. algorithms for Filtered Back Projection. With the conventional fan beam arrangements in FIG. 3A and FIG. 3B, a larger number of projection signals are generally affected by objects that touch the intersection points on the center line than by objects that touch the intersection points outside the center line, since a touch on the center line affects many more detection lines. Thereby, the image reconstruction algorithm may inherently overemphasize regions near the center line, resulting in a locally increased sensitivity and a risk of enhancing noise and systematic errors in this region. Any such tendency is suppressed or at least reduced in the embodiments in FIGS. 4A-4C.

It should be noted that this advantageous effect is far from intuitive for the skilled person who is familiar with another class of optical touch systems, in which light is propagated in the free air above the touch surface and in which the location of touching objects is determined by detecting that the light paths across the touch surface are interrupted or blocked by the touching object. This class of optical touch systems is e.g. known from U.S. Pat. No. 6,690,363, U.S. Pat. No. 6,429,857, U.S. Pat. No. 7,042,444, US2010/0066016, U.S. Pat. No. 7,855,716, WO2010/081702 and WO2010/112404. As explained in WO2010/112404, to enable multi-touch determination of n−1 objects in simultaneous contact with a touch surface, each point on the touch surface needs to be passed by n different light paths. Thus, the general teaching is here that the emitters and detectors should be configured and arranged so as to maximize the number of intersecting propagation paths across the detection grid. In contrast, embodiments of the invention generally aim at reducing, on average, the number of intersecting propagation paths.

The skilled person realizes that there are many alternative implementations of the general design principle. For example, one or more blocks may consist of more than two components, such as XXX or YYY. However, it may be desirable to keep down the length of the blocks, since the detection lines may become undesirably sparse near row portions that include several consecutive emitters or detectors. In certain implementations, it may therefore be desirable to limit the length of the blocks to e.g. two, three or four components.

In all embodiments, both rows 20A, 20B may but need not include the same number of components.

In the above-described embodiments, all components are arranged with equidistant center-to-center spacing within each row. Such a design may facilitate manufacture of the touch-sensitive apparatus. However, it is conceivable to achieve further improvements in terms of uniformity and/or gap size of the detection grid, by varying the spacing of the components within one or both rows. In one embodiment, the spacing between components is randomized. In another embodiment, the components are systematically arranged in spatially separate groups along a row, such that the center-to-center spacing between adjacent components within each group (intra-group spacing) is less than the center-to-center spacing between adjacent components in different groups (inter-group spacing). The groups may be defined irrespective of type, i.e. each group may include any combination of emitter and detectors. Alternatively, the groups may be defined to only include components of the same type, or to only include components of both types. Depending on implementation, the inter-group spacing may be fixed or varying within a row, and the intra-group spacing may be fixed or varying within a row.

Further details on grouping of components are disclosed in Applicant's U.S. provisional application U.S. 61/650,618 filed on May 23, 2012 which is incorporated herein by reference.

In one embodiment of the invention, the ratio between the number of detectors and emitters is selected in order to provide an optimal number of detection lines. The equations for determining a range of suitable ratio values are derived below.

For an arrangement where there is n number of emitters and m number of detectors along one end of panel, and a corresponding number of emitters and detectors along the opposite end of the panel, s is the number of detection lines:

$$s = 2n \cdot m \quad (1)$$

Where d is the difference between the number of detectors and emitters along one end of the panel:

$$m = n + d \quad (2)$$

Where k is the total number of detectors and emitters along one end of the panel:

$$m + n = k \quad (3)$$

Therefore, from (2) and (3), we get:

$$n = \frac{k-d}{2} \quad (4)$$

From (1) and (2), we get:

$$s = 2n(n+d) = 2n^2 + 2nd \quad (5)$$

Substituting (4) into (5), we get:

$$s = \frac{2(k-d)^2}{4} + \frac{2(k-d)d}{2} \quad (6)$$

$$s = \frac{k^2}{2} - \frac{d^2}{2}$$

If we use r to describe the ratio of emitters to detectors (i.e. =n/m) along one end of the panel, then using (2) and (4), we end up with:

$$r = \frac{k+d}{k-d} \quad (7)$$

Difference d can therefore be expressed as:

$$d = \frac{k(r-1)}{r+1} \quad (8)$$

Substituting (8) into (6):

$$s = \frac{k^2}{2} - \frac{\left(\frac{k(r-1)}{r+1}\right)^2}{2} \quad (9)$$

$$s = \frac{k^2 - \frac{k^2(r-1)^2}{(r+1)^2}}{2}$$

$$s = \left(\frac{k^2}{2}\right)\left(1 - \frac{(r-1)^2}{(r+1)^2}\right)$$

Figure 6:
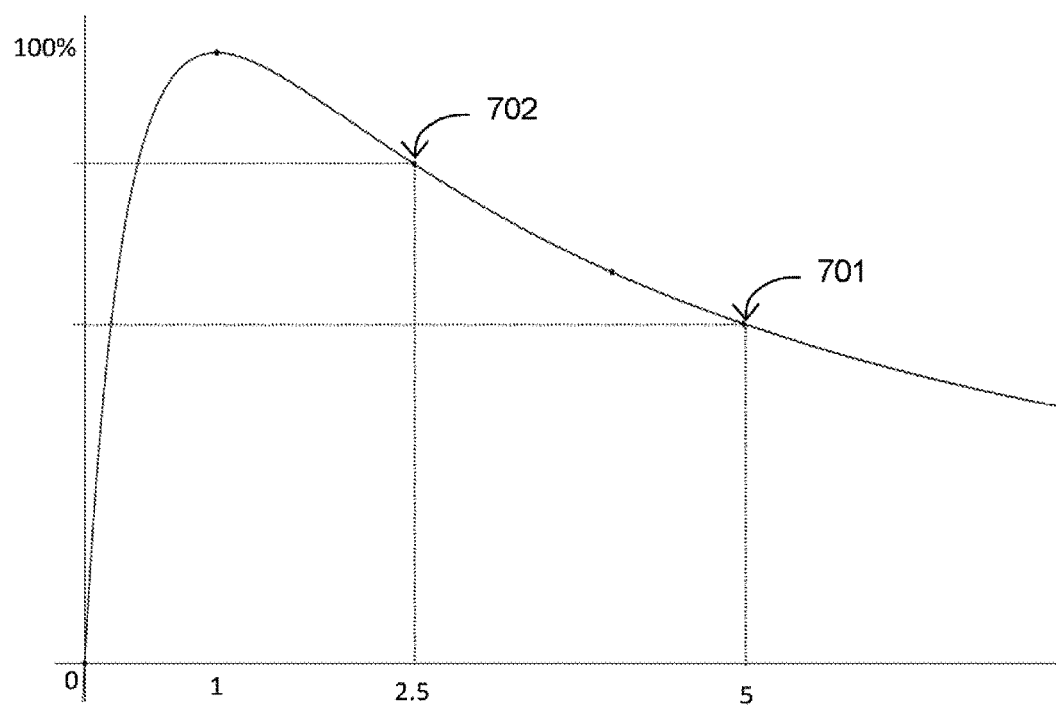
FIG. 6 is a graph showing the relationship between the ratio between the emitters and detectors (along the horizontal axis) and the number of detection lines (along the vertical axis) as a percentage of the maximum number of possible detection lines.

Equation (9) shows the relationship between the ratio of emitters to detectors to the number of detection lines. If we plot the number of detection lines relative to the ratio, we get the graph shown in FIG. 6. FIG. 6 is a graph showing the relationship between the ratio between the emitters and detectors (along the horizontal axis) and the number of detection lines (along the vertical axis) as a percentage of the maximum number of possible detection lines. Point 701 shows the percentage value when the ratio is 5 and point 702 shows the percentage value when the ratio is 2.5.

Consequently, we see that the number of possible detection lines are affected by the ratio between the number of detectors and the number of emitters. The optimal ratio is 1 and anything outside of the range of 0.2-5 results in the number of possible detection lines being less than 50% of the maximum number. As the number of detection lines is proportional to the number of cross over points capable of providing touch information, a reduced number of detection lines may result in a reduced quality of touch detection.

Therefore, it is advantageous to have a ratio between the number of detectors and the number of emitters to be at least in the range of the range of 0.2-5.

In terms of the present invention, one embodiment of the invention should preferably comprise, in at least one of the opposite rows 20A, 20B, a ratio of the components of the first type to the components of the second type in the range of between 0.2 and 5 in order to provide a suitable number of detection lines. A ratio outside of this range will result in a lower quality touch experience. Even more preferably, the ratio of the components of the first type to the components of the second type for the entire touch panel is between 0.2 and 5. Even more preferably, the ratio of the components of the first type to the components of the second type for either at least one of the opposite rows or the entire touch panel is between 0.4 and 2.5, which allows the number of possible detection lines to be greater than 80% of the maximum number given the number of components.

Irrespective of implementation, the spacing of components is typically between 1-20 mm. Each row may thus include a large number of components, typically more than 20 or 30 components, and it conceivable that the number of components in each row is 50-200, or even more.

Figure 5A:
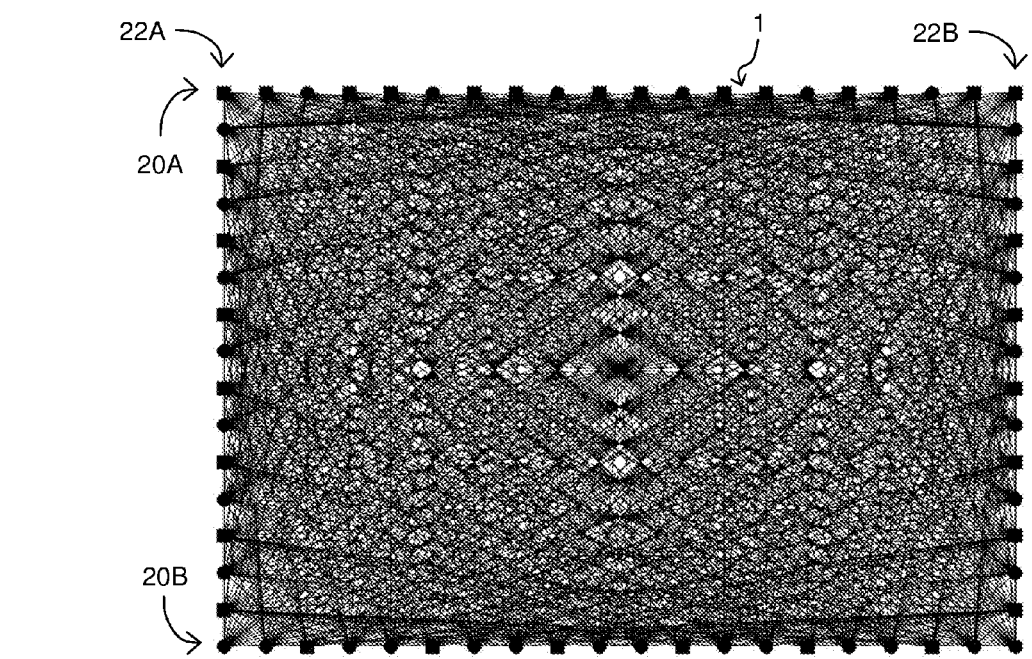
FIG. 5A is a top plan view of a grid of detection lines in an apparatus which is designed with two orthogonal rows of components.
Figure 5B:
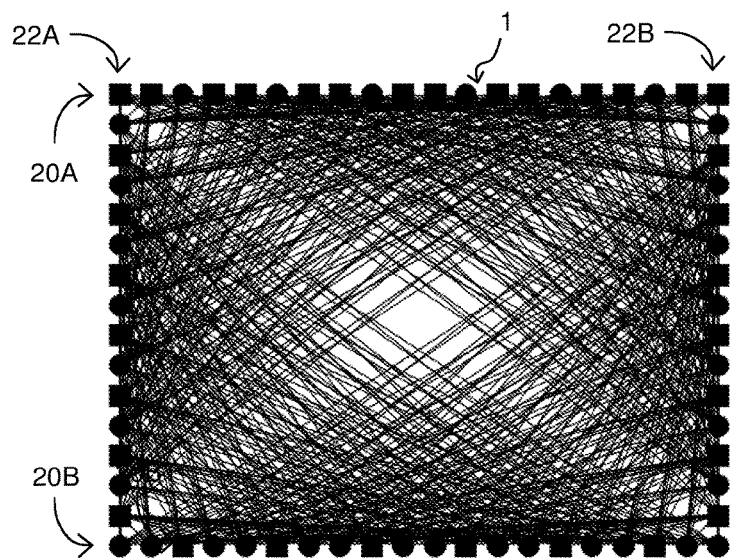
FIG. 5B is a top plan view that illustrates the subset of detection lines that are formed between the orthogonal rows of components.

It is also conceivable that the touch apparatus 100 comprises both horizontal rows 20A, 20B and vertical rows 22A, 22B, which define a respective sub-grid of detection lines ("horizontal sub-grid" and "vertical sub-grid"). Such an embodiment is illustrated in FIG. 5A in which the horizontal rows 20A, 20B are designed according to the first embodiment (cf. FIG. 4A), and the vertical rows 22A, 22B are designed with a conventional interleaved arrangement (cf. FIG. 3A). As seen, the provision of the vertical rows 22A, 22B generate further detection lines that improve the uniformity of the grid of detection lines, e.g. at the horizontal ends of the grid. Further improvement with respect to uniformity/spatial resolution may be achieved by optimizing the vertical row, e.g. by applying the general design principle also to the vertical dimension of the panel. It is to be noted, however, that the design rules may differ between the horizontal rows 20A, 20B and the vertical rows 22A, 22B. The provision of the vertical rows 22A, 22B will not only define the vertical sub-grid between the vertical rows 22A, 22B, but also a blended sub-grid between each vertical row 22A, 22B and both horizontal rows 20A, 20B. Such a blended sub-grid is illustrated in FIG. 5B for the arrangement of components according to FIG. 5A. For example, the design rules for the horizontal and vertical rows may be adapted such that the detection lines in the blended sub-grid has a desired extent through any gaps in the horizontal and vertical sub-grids.

It should be noted that certain image reconstruction techniques, e.g. tomographic techniques, may require (or benefit from) a uniform angular distribution of detection lines on the touch surface, i.e. that the detection lines that intersect a respective reconstruction cell on the touch surface are evenly distributed in the angular direction, and possibly also that the number of intersecting detection lines is approximately the same between all reconstruction cells. A reconstruction cell denotes a sub-area of the touch surface which is assigned an attenuation value by the reconstruction process. A closer examination of FIG. 5A reveals that it may be possible to configure the vertical and blended sub-grids so as to achieve a sufficiently uniform angular distribution of detection lines at the horizontal ends where detection lines are sparse in the horizontal sub-grid (cf. FIGS. 4A-4C). However, to the extent that the horizontal sub-grid contains large gaps at the center of the touch surface, it may be difficult to achieve a sufficiently uniform angular distribution of detection lines in these gaps by means of the vertical and blended sub-grids, since these sub-grids lack vertical or nearly vertical detection lines at the center of the touch surface, e.g. as shown for the blended sub-grid in FIG. 5B. Thus, if a uniform angular distribution of detection lines is required, it may be necessary or desirable to minimize gaps in the center portion of the touch surface.

As used herein, "horizontal", "vertical", "upper" and "lower" merely refer to directions on the drawings and does not imply any particular positioning of the panel 1.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, one or both of the opposite rows may, in addition to the arrangement of consecutive blocks in accordance with the general design rule, include additional components (emitters and/or detectors) that are arranged according to another design rule.

Furthermore, all the above embodiments, examples, variants and alternatives given with respect to an FTIR-based touch system are equally applicable to a touch-sensitive apparatus that operates by transmission of other energy than light. In one example, the touch surface may be implemented as an electrically conductive panel, the emitters and detectors may be electrodes that couple electric currents into and out of the panel, and the output signal may be indicative of the resistance/impedance of the panel on the individual detection lines. In another example, the touch surface may include a material acting as a dielectric, the emitters and detectors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the detectors may be vibration sensors (e.g. acoustic or piezoelectric sensors).

The invention claimed is:

1. A touch-sensitive apparatus, comprising:
a panel defining a touch surface; and
opposite rows of components connected for energy exchange with the panel at opposite ends of the touch surface, each of the components being a first type of component or a second type of component, the first type of component configured to emit energy as a diverging beam, and the second type of component configured to detect energy, each of the opposite rows including an arrangement of consecutive component blocks, each component block including only components of the first type or components of the second type, and each component block defined by a type value and a number value, the type value indicating the type of components in the component block, and the number value indicating the number of components in the component block;
wherein each of the opposite rows includes a respective sequence of two component blocks of different types, and each of the opposite rows is defined by systematically repeating the respective sequence along the respective opposite end;
wherein the two component blocks in the sequence included in one of the opposite rows have different number values;

wherein at least one component block differs between the sequences included in the opposite rows; and wherein the opposite rows define a grid of transmission paths that extend across the touch surface from the components of the first type to the components of the second type, each of the components of the second type configured to detect energy on a set of transmission paths that extend from at least two of the components of the first type.

2. The touch-sensitive apparatus of claim 1, wherein the component blocks include a maximum of two components.

3. The touch-sensitive apparatus of claim 1, wherein the two component blocks in the sequence included in another of the opposite rows have different number values.

4. The touch-sensitive apparatus of claim 1, wherein
one of the opposite rows includes a component block with one component of the first type and a component block with two components of the second type; and another of the opposite rows includes of a component block with two components of the first type and a component block with one component of the second type.

5. The touch-sensitive apparatus of claim 1, wherein, in at least one of the opposite rows, the ratio of the number of components of the first type to the number of components of the second type is in the range of between 0.2 and 5.

6. The touch-sensitive apparatus of claim 1, wherein each of the opposite rows comprises at least 20 components.

7. The touch-sensitive apparatus of claim 1, wherein a mutual spacing of the components is equidistant in at least one of the opposite rows.

8. The touch-sensitive apparatus of claim 1, wherein a mutual spacing of the components is systematically or randomly varied within at least one of the opposite rows.

9. The touch-sensitive apparatus of claim 1, further comprising:
a signal processor configured to acquire an output signal from the components of the second type, the output signal indicative of the detected energy on each of the transmission paths in the grid of transmission paths, and the signal processor further configured to process the detected energy to determine a property of a touching object on the touch surface.

10. The touch-sensitive apparatus of claim 1, wherein the second type of component is a detector configured to receive energy within a range of angles of incidence.

11. The touch-sensitive apparatus of claim 10, wherein
each component of the first type is an emitter configured to generate radiation;

each component of the first type is optically coupled to the panel so as to propagate a diverging beam of radiation across the touch surface by internal reflections inside the panel; and each detector is optically coupled to the panel, and configured to detect transmitted radiation from at least two emitters.

12. The touch-sensitive apparatus of claim 1, wherein
maximum spacing of transmission paths for a given mutual spacing between components is less than a maximum spacing of transmission paths for an alternating arrangement of single components of the first type and the second type in both of the opposite rows.

13. The touch-sensitive apparatus of claim 1, wherein
said transmission paths form a plurality of intersection points on the touch surface; and an average number of transmission paths per intersection point for a given mutual spacing between components is less than an average number of transmission paths per intersection point for an alternating arrangement of single components of the first type and the second type in both of the opposite rows.

14. A touch-sensitive apparatus, comprising:
a panel defining a touch surface; and opposite rows of components connected for energy exchange with the panel at opposite ends of the touch surface, each of the components being a first type of component or a second type of component, the first type of component configured to emit energy as a diverging beam, and the second type of component configured to detect energy, each of the opposite rows including an arrangement of consecutive component blocks, each component block including only components of the first type or components of the second type, and each component block defined by a type value and a number value, the type value indicating the type of the components in the component block, and the number value indicating the number of components in the component block;

wherein each of the opposite rows includes a respective sequence of two component blocks of different types, and each of the opposite rows is defined by systematically repeating the respective sequence along the respective opposite end;

wherein the two component blocks in the sequence included in one of the opposite rows have different number values;

wherein at least one component block differs between the sequences included in the opposite rows;

wherein one of the opposite rows includes a component block with one component of the first type and a component block with two components of the second type; and wherein another of the opposite rows includes of a component block with two components of the first type and a component block with one component of the second type.

15. The touch-sensitive apparatus of claim 1, wherein each of the opposite rows comprises at least 30 components.

16. The touch-sensitive apparatus of claim 1, wherein the component blocks include a maximum of three components.

* * * * *